United States Patent
Liu et al.

(10) Patent No.: US 9,264,940 B2
(45) Date of Patent: Feb. 16, 2016

(54) FEEDBACK METHOD AND DEVICE FOR HEADER COMPRESSION FEEDBACK INFORMATION

(71) Applicants: Jiamin Liu, Beijing (CN); Wei Bao, Beijing (CN)

(72) Inventors: Jiamin Liu, Beijing (CN); Wei Bao, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 189 days.

(21) Appl. No.: 13/691,748

(22) Filed: Dec. 1, 2012

(65) Prior Publication Data

US 2013/0182640 A1 Jul. 18, 2013

Related U.S. Application Data

(63) Continuation of application No. PCT/CN2011/073618, filed on May 3, 2011.

(30) Foreign Application Priority Data

Jun. 22, 2010 (CN) .......................... 2010 1 0215913

(51) Int. Cl.
*H04W 4/00* (2009.01)
*H04W 28/06* (2009.01)
*H04L 29/06* (2006.01)
*H04W 84/04* (2009.01)

(52) U.S. Cl.
CPC ............. *H04W 28/065* (2013.01); *H04L 69/04* (2013.01); *H04L 69/22* (2013.01); *H04W 28/06* (2013.01); *H04W 84/047* (2013.01)

(58) Field of Classification Search
CPC .......................... H04W 28/06; H04W 28/065
USPC ......................................................... 370/328
See application file for complete search history.

(56) References Cited

U.S. PATENT DOCUMENTS 7,209,491 B2 * 4/2007 Zheng et al. .................. 370/477
8,249,103 B2 * 8/2012 Yi .......................... H04W 28/06
                                                        370/469

(Continued)

FOREIGN PATENT DOCUMENTS

CN          1894922      1/2007
WO       2009099845      8/2009

OTHER PUBLICATIONS

ISR for related PCT/CN2011/073618 mailed on Aug. 18, 2011 and its English translation.

(Continued)

*Primary Examiner* — Shripal Khajuria
*Assistant Examiner* — Faisal Choudhury
(74) *Attorney, Agent, or Firm* — Ladas & Parry, LLP

(57) ABSTRACT

The present invention discloses a feedback method and device for header compression feedback information: After RN is introduced in LTE-A system, user data transmitted at Un interface possesses a complex header structure with nesting double-IP containing GTP. Through application of the technical solution put forward by the embodiments of the present invention, different types of header compression feedback information carried in control PDU can be analyzed and processed with corresponding strategies according to the information in control PDU, thus effectively realizing separate compression and feedback for double headers and improving data transmission efficiency at Un interface.

12 Claims, 4 Drawing Sheets

(56) References Cited

U.S. PATENT DOCUMENTS

| | | | |
|---|---|---|---|
| 8,599,878 B2* | 12/2013 | Wu et al. | 370/477 |
| 2004/0001508 A1* | 1/2004 | Zheng | H04L 12/4633 370/466 |
| 2007/0248075 A1* | 10/2007 | Liu | H04L 65/1016 370/349 |
| 2010/0202476 A1* | 8/2010 | Chun | H04W 28/06 370/477 |
| 2010/0215020 A1* | 8/2010 | Lee | H04L 1/1614 370/331 |
| 2010/0322151 A1* | 12/2010 | Racz et al. | 370/328 |
| 2011/0019695 A1* | 1/2011 | Wu | H04W 28/06 370/477 |
| 2011/0306309 A1* | 12/2011 | Yabe | 455/72 |
| 2012/0028631 A1* | 2/2012 | Chun | H04L 1/1614 455/422.1 |
| 2012/0039245 A1* | 2/2012 | Wang et al. | 370/315 |

OTHER PUBLICATIONS

IPRP for related PCT/CN2011/073618 issued on Dec. 28, 2012 and its English translation.

CATT, Comparison of Header Compression Schemes over Un, 3GPP TSG RAN WG2 Meeting, R2-103595.

Nokia Siemens Networks, et al. Complexity of Two Header Compression, 3GPP TSG Ran WG2 Meeting #70Bis R2-103519 [online], Jun. 21, 2010.

Office Action for related Chinese Patent Application No. 201010215913.7 dated Jun. 27, 2013 and its English translation by the applicants.

* cited by examiner

| | | | | | | | |
|---|---|---|---|---|---|---|---|
| D/C | PDU Type | | O/I | | R | R | Oct 1 |
| Size | | | | | | | Oct 2 |
| Interspersed ROHC feedback packet | | | | | | | |
Figure 11
| | | | | | |
|---|---|---|---|---|---|
| D/C | PDU Type | | O/I | Code | Oct 1 |
| Size | | | | | Oct 2 |
| Interspersed ROHC feedback packet | | | | | |
Figure 12
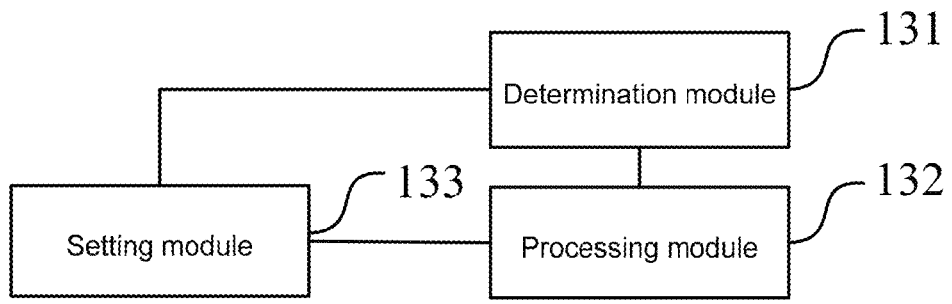
Figure 13
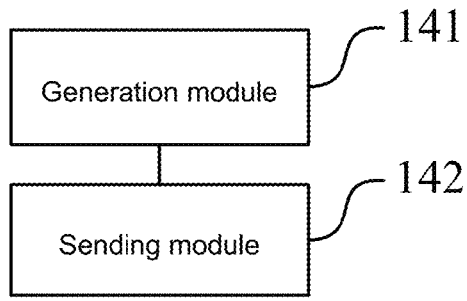
Figure 14

FEEDBACK METHOD AND DEVICE FOR HEADER COMPRESSION FEEDBACK INFORMATION

CROSS REFERENCE TO RELATED APPLICATIONS

This application is a continuation of PCT/CN2011/073618 filed on May 3, 2011, which claims priority to Chinese Patent Application No. 201010215913.7 entitled "Feedback Method and Device for Header Compression Feedback Information" filed in the Patent Office of the People's Republic of China on Jun. 22, 2010, the disclosures of which is are hereby incorporated by reference in their entireties.

FIELD OF THE INVENTION

The present invention relates to the field of communication technology, in particular to a feedback method and device for header compression feedback information.

BACKGROUND OF THE INVENTION

In ROHC (Robust Header Compression) put forward by RFC3095 protocol, header compression is described as the interaction between two state machines (compression and decompression state machine). Compression gain is obtained through establishing context at both ends of the link, namely a set of static and dynamic header fields. Context must be synchronized during operation of compression and decompressor. ROHC adds CRC (Cyclic Redundancy Check) in compression packet and ensures context is updated timely and correctly through feeding back ACK/NACK (Acknowledgement/Negative Acknowledgement).

Compressor is in one of the three statuses: IR (Initialize Refresh) status, FO (First Order) status and SO (Second Order) status, which represents the degree of available header compression.

Decompressor is also in one of the three statuses: NC (No Context), SC (Static Context) and FC (Full Context) status, which represents the ability of decompressor to decompress corresponding data packet header, thus the status corresponds to the performance of header compression. Mutual transition can be conducted among statuses.

ROHC supports three operation modes: U (unidirectional) mode, O (bi-directional optimization) mode and R (bi-directional reliable) mode. Inter-conversion can be conducted among the three modes. Each mode stipulates the methods and frequency of information interaction, for example, whether feedback is widely used. If reliable mode is converted timely, more feedback information such as status, special field, etc. will be interacted to ensure consistence of receiver and sender's context as much as possible, thus improving the probability of correct decompression in high compression ratio status.

When RFC3095 protocol stipulates that CRC of decompressor is conducted successfully, ACK is fed back if it refers to updated packet, namely IR/DYN package at present. Compression and decompressor work in U mode initially. Decompressor will be in O or R mode and feed back ACK to compressor after it successfully decompresses an updated packet, thus triggering compressor to be converted into O or R mode. Later the two ends will work in O or R mode. If decompressor continuously detects successful CRC, status transition from NC, SC to FC will be conducted and ACK (O mode) will be fed back to convert R mode to O mode. If decompressor continuously detects CRC failure, the status will be degraded by converting O mode to R mode and NACK (R mode) will be fed back. According to feedback information, compressor operates corresponding actions to coordinate the synchronization of context status.

After LTE-A (Long Term Evolution Advanced) system introduces Relay, network architecture diagram is determined preliminarily as shown in FIG. 1. The node includes:

Donor-eNB (Donor Evolved Node B, DeNB): eNB wirelessly connected to RN;

Relay-Node (Relay node, RN): the entity between DeNB and UE (User Equipment);

Relay-UE (R-UE): UE which performs data interaction with RN, and it can be LTE UE;

Macro UE: UE which performs direct data interaction with DeNB, and it has nothing to do with RN.

The interface includes:

Un interface: the interface between RN and DeNB

Uu interface: the interface between UE and RN

Such network architecture makes user data transmitted at Un interface have complex head construction with nesting IP (Internet Protocol) and GTP (GPRS Tunnelling Protocol, GPRS: General Packet Radio Service) as shown in FIG. 2, which is a diagram of data packet structure of VoIP (Voice over Internet Protocol) at Un interface. Explanation is given below by taking voice service as the example:

Outer IP/UDP (User Datagram Protocol) header corresponds to IP address carrying RN, GTP header carries UE-related service-bearing tunnel information, and inner IP/UDP/RTP (Real-time Transport Protocol) corresponds to IP address and service information of UE. For outer and inner IP, headers such as UDP and RTP can be compressed with existing compression profiles in PDCP (Packet Data Convergence Protocol).

In the present PDCP, the format and information of PDU (Packet Data Unit) transmitting compression feedback are shown in FIG. 3.

Herein, the meaning of field information value in D/C field and PDU Type field is shown in FIGS. 1 and 2 respectively.

TABLE 1

Meaning of Field Information Value in D/C Field

| Bit | Description |
|---|---|
| 0 | Control PDU |
| 1 | Data PDU |

TABLE 2

Meaning of Field Information Value in PDU Type Field

| Bit | Description |
|---|---|
| 000 | PDCP status report |
| 001 | Interspersed ROHC feedback packet |
| 010-111 | Reserved |

In course of implementing the present invention, the inventor finds out there are at least the problems below in the present technology:

There is no scheme for the whole IP/UDP+GTP+IP/UDP/RTP header compression in the present compression profiles, which can only process outer IP header (such as IP/UDP or IP/TCP) and inner IP header (such as IP/UDP/RTP or IP/TCP), without including GTP.

In the present PDCP, only one ROHC feedback format is supported. That is to say the feedback of outer and inner header can not be effectively differentiated with the scheme for respective compression of outer and inner IP header, thus compression profiles cannot be correctly implemented, which greatly affects compression efficiency.

SUMMARY OF THE PRESENT INVENTION

The present invention provides a feedback method and device for header compression feedback information to process such information correspondingly according to source type.

The embodiments of the present invention provide a feedback method for header compression feedback information, including:

PDCP compressor device receives control PDU sent by PDCP decompressor device and determines source type of header compression feedback information according to said control PDU;

Said PDCP compressor device processes header compression feedback information carried in said control PDU correspondingly according to source type of such determined information.

The embodiments of the present invention also provide a kind of PDCP compressor device, including:

Determination module, which is used to determine source type of header compression feedback information according to received control PDU sent by PDCP compressor device;

Processing module, which is used to process header compression feedback information carried in said control PDU correspondingly according to source type of such information determined by said determination module.

The embodiments of the present invention also provide a feedback method for header compression feedback information, including:

PDCP decompressor device generates control PDU carrying header compression feedback information according to source type;

Said PDCP decompressor device sends said control PDU to PDCP compressor device to enable said PDCP compressor device to process header compression feedback information carried in said control PDU correspondingly.

The embodiments of the present invention also provide a kind of PDCP decompressor device, including:

Generation module, which is used to generate control PDU carrying header compression feedback information according source type;

Sending module, which is used to send control PDU generated by said generation module to PDCP compressor device to enable said PDCP compressor device to process header compression feedback information carried in said control PDU correspondingly.

Compared with the present technology, the present invention possesses the following advantages:

Different types of header compression feedback information carried in control PDU can be analyzed and processed correspondingly according to the information in control PDU through application of the technical solution put forward by the embodiments of the present invention, thus realizing respective compression and feedback for double headers effectively and improving data transmission efficiency at Un interface.

BRIEF DESCRIPTION OF THE DRAWINGS

FIG. 11 is a diagram of a kind of control PDU in the embodiments of the present invention;

FIG. 12 is a diagram of control PDU in the embodiments of the present invention;

FIG. 13 is a structure diagram of PDCP compressor device in the embodiments of the present invention;

FIG. 14 is a structure diagram of PDCP decompressor device in the embodiments of the present invention.

DETAILED DESCRIPTION OF THE EMBODIMENTS OF THE INVENTION

The core idea of technical solution put forward by the embodiments of the present invention lies in: Inner and outer headers are compressed respectively and GTP is preserved during compression at Un interface. Herein, inner and outer headers are compressed respectively with the present compression profiles to respectively maintain context information and CID identification of their own. PDCP decompressor generates header compression feedback information according to respective compression status and profiles and clearly indicates inner and/or outer compression feedback information with appropriate field in corresponding control PDU format. After receiving control PDU carrying header compression feedback information, PDCP compressor analyzes inner and/or outer compression feedback information according to identification and transmits such analyzed information to inner or outer header compression module to process according to the present procedure.

Implementation of compression and decompressor devices as well as the coordination of the two are explained in the process of explanation, which doesn't mean that the two must be implemented in a combined manner. In fact, separate implementation of the two also resolves the problems on compression and decompressor devices. However, the combination of the two can gain better technical effects.

Figure 4:
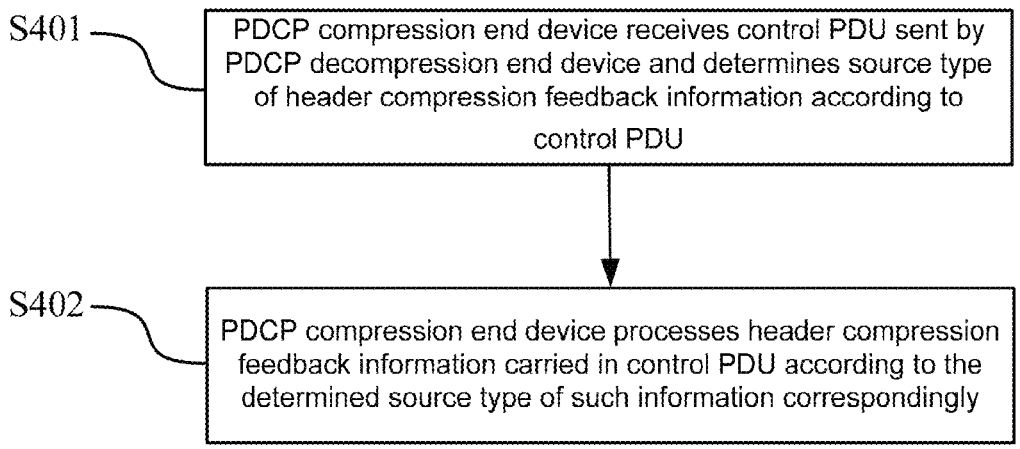
FIG. 4 is a flow diagram of a feedback method for header compression feedback information on PDCP compressor device side in the embodiments of the present invention.

The flow diagram of a feedback method for header compression feedback information provided by the embodiments of the present invention is shown in FIG. 4, which includes the following steps:

Step 401: PDCP compressor device receives control PDU sent by PDCP decompressor device and determines source type of header compression feedback information according to control PDU.

In specific application scene, the methods for determining source type of header compression feedback information by PDCP compressor device according to control PDU specifically includes the following two:

Method I: PDCP compressor device determines source type of header compression feedback information according to the information in PDU Type field of control PDU.

Method II: PDCP compressor device determines source type of header compression feedback information according to the information in type indication field comprised of one or more reserved fields of control PDU.

Herein, when only separate feedback of inner or outer header compression may exist in the scene or only source type of separate feedback of inner or outer header compression is required to be identified, set the information on source type corresponding to separate feedback of inner or outer header compression in PDU Type field only, to correspond to the aforementioned Method I. Reduce the quantity of reserved fields occupied by type indication fields in control PDU, to correspond to the aforementioned Method II, thus occupying space length of source type indicating separate feedback of inner or outer header compression only. Under this condition, the two methods mentioned above only show separate feedback type of outer and inner header compression.

Under another condition when not only separate feedback of outer or inner header compression but also cascading feedback type of outer and inner header compression according to preset feedback order may exist in the scene, or it is necessary to identify separate feedback of outer or inner header compression and cascading feedback type of outer and inner header compression according to preset feedback order, set at least information on source types corresponding to separate feedback of inner or outer header compression and cascading feedback of outer and inner header compression according to preset feedback order in PDU Type field, to correspond to the aforementioned Method I. However, it is necessary to increase the quantity of reserved field occupied by type indication field in control PDU to correspond to the aforementioned Method II, thus occupying space length of source type indicating separate feedback of outer or inner header compression and cascading feedback of outer and inner header compression according to preset feedback order in PDU Type field. Under this condition, the two methods mentioned above can show separate feedback type of outer header compression, separate feedback type of inner header compression, and cascading feedback type of outer and inner header compression according to preset feedback order.

Step 402: PDCP compressor device processes header compression feedback information carried in control PDU according to the determined source type correspondingly.

Specifically as:

When PDCP compressor device determines that source type of header compression feedback information refers to separate feedback type of outer header compression according to control PDU, PDCP compressor device processes such information carried in control PDU according to processing strategies for corresponding outer header compression;

When PDCP compressor device determines that source type of header compression feedback information refers to separate feedback type of inner header compression according to control PDU, PDCP compressor device processes such information carried in control PDU according to processing strategies for corresponding inner header compression;

When PDCP compressor device determines that source type of header compression feedback information refers to cascading feedback type of outer and inner header compression according to preset feedback order according to control PDU, PDCP compressor device processes such information carried in control PDU according to preset feedback order or according to processing strategies for outer and inner header compression after source type of such header compression feedback information is differentiated.

Herein, when control PDU excludes size information of header compression feedback information, PDCP compressor device performs direct outer or inner header compression processing for header compression feedback information carried in control PDU according to preset feedback order, and subsequently perform header compression processing for remaining header compression feedback information;

When control PDU includes size information of header compression feedback information, PDCP compressor device acquires such size information, and divide header compression feedback information in control PDU into two parts according to such size information, and process the two parts of header compression feedback information respectively with corresponding processing strategies according to preset feedback order.

It should be further pointed out that size information of header compression feedback information in control PDU refers to indication field comprised of size information field and/or one or more reserved fields included in control PDU. In this case, the process of acquiring size information of header compression feedback information by said PDCP specifically includes:

When control PDU contains size information field rather than indication field, PDCP compressor device acquires size information of header compression feedback information in size information field directly;

When control PDU contains indication field, PDCP compressor device identifies the content of indication field. If this content refers to size information of header compression feedback information, control PDU excludes size information field and PDCP compressor device acquires such size information in indication field directly. If this content refers to indication information that size information field exists in control PDU, PDCP compressor device inquires corresponding size information field in control PDU to acquire size information of header compression feedback information in size information field.

Figure 5:
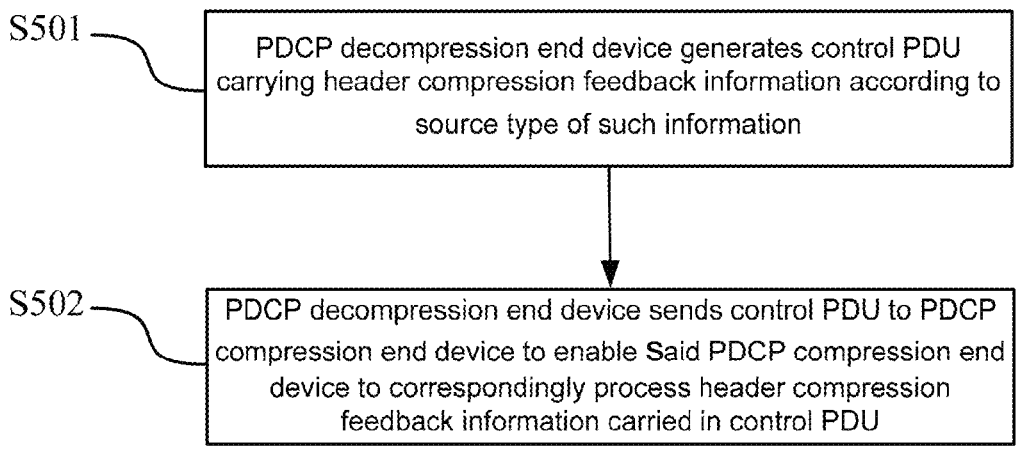
FIG. 5 is a flow diagram of a feedback method for header compression feedback information on PDCP decompressor device side in the embodiments of the present invention.

The realization procedure of a feedback method for header compression feedback information put forward by the embodiments of the present invention on PDCP compressor device side is described above. Realization procedure of that on PDCP decompressor device side is explained below with flow diagram shown in FIG. 5, which includes the following steps:

Step 501: PDCP decompressor device generates control PDU carrying header compression feedback information according to source type.

Specifically including:

PDCP decompressor device identifies source type of header compression feedback information through the information in PDU Type field of control PDU; or, PDCP decompressor device identifies source type of header compression feedback information through the information in type indication field comprised of one or more reserved fields of control PDU;

Herein, source type of header compression feedback information refers to separate feedback type of outer header compression, separate feedback type of inner header compression or cascading feedback type of outer and inner header compression according to preset feedback order.

It should be further pointed out that when source type of header compression feedback information refers to cascading feedback type of outer and inner header compression according to preset feedback order, control PDU also includes:

Size information field of size information containing header compression feedback information; or, Indication field of size information containing header compression feedback information; or, Indication field of indication information containing size information field in control PDU, and size information field of size information containing header compression feedback information.

Step 502: PDCP decompressor device sends control PDU to PDCP compressor device to enable said PDCP compressor device to process header compression feedback information carried in control PDU correspondingly.

It can be seen in the above embodiments that the embodiments of the present invention at least possess the following advantages compared with the present technology:

After RN is introduced in LTE-A system, user data transmitted at Un interface possesses a complex header structure with nesting double-IP containing GTP. Through application of the technical solution put forward by the embodiments of the present invention, different types of header compression feedback information carried in control PDU can be analyzed and processed with corresponding strategies according to the information in control PDU, thus effectively realizing separate compression and feedback for double headers and improving data transmission efficiency at Un interface.

The technical solution put forward by the embodiments of the present invention will be explained in combination with actual implementation scene.

Figure 6:
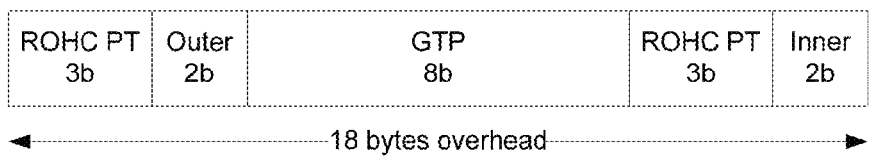
FIG. 6 is a structure diagram of the compressed header in the embodiments of the present invention.

As previously mentioned, inner and outer headers are compressed respectively and GTP header is preserved during header compression at Un interface. Herein, inner and outer headers are compressed respectively with the present compression profiles to maintain context information and CID identification respectively. PDCP decompressor generates header compression feedback information according to compression status and profiles respectively and indicates inner or outer compression feedback information with appropriate field clearly in corresponding format of control PDU. After receiving control PDU carrying header compression feedback information, PDCP compressor device analyzes inner and/or outer compression feedback information according to identification and transmits such analyzed information to corresponding inner or outer header compression module to process respectively according to the present procedure. The above procedures are further explained below:

Firstly, the structure diagram of compressed header is shown in FIG. 6. Under this structure, the embodiments of the present invention provide the feedback embodiments for various kinds of header compression feedback information below through different expanding strategies.

Embodiments I: Expand the information in PDU Type field (excluding cascading feedback type)

Figure 1:
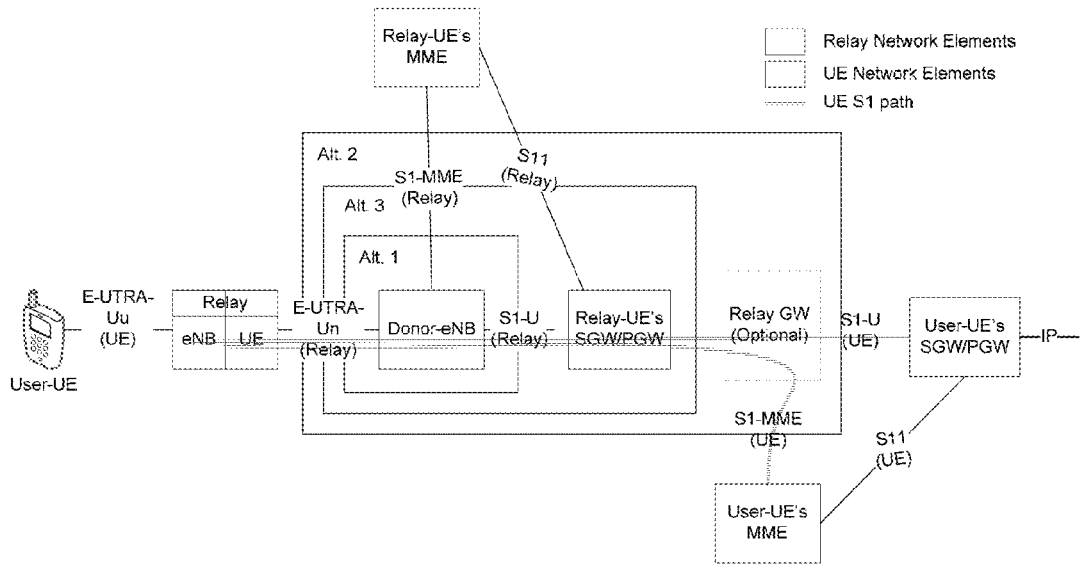
FIG. 1 is a network structure diagram containing RN in background technology.
Figure 2:
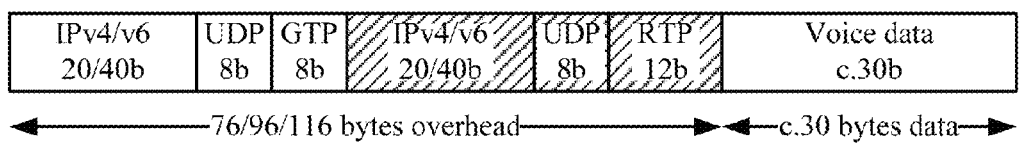
FIG. 2 is a structure diagram of VoIP data packet at Un interface in background technology.
Figure 3:
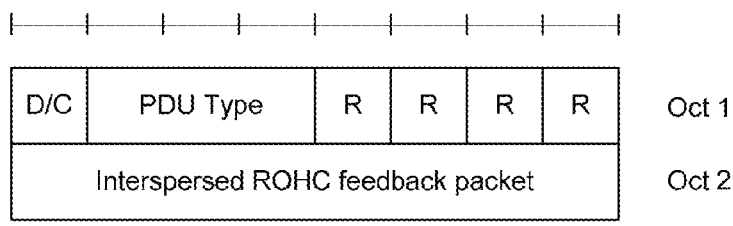
FIG. 3 is a diagram of control PDU in background technology.

The format of control PDU is still shown in FIG. 3. However, value selection rule of PDU Type field is adjusted as shown in Table 3.

TABLE 3

Meaning of Field Information Value of PDU Type Field

| Bit | Description |
|---|---|
| 000 | PDCP status report |
| 001 | Interspersed ROHC feedback packet for outer header |
| 010 | Interspersed ROHC feedback packet for inner header |
| 011-111 | reserved |

If PDCP decompressor device needs to feed back the status of outer header compression, the format of control PDU is shown in FIG. 3. Set D/C field as 0 and the value in PDU type field as 001, and process other fields according to the present procedure, and send this control PDU to PDCP decompressor device at opposite end.

When receiving this control PDU, PDCP compressor device analyzes it and read D/C field to know it is control PDU, and read PDU type field to know this control PDU carries the feedback information of outer header compression. Therefore, only sending Interspersed ROHC feedback packet carried in this control PDU to outer header compression processing module for corresponding processing is needed.

In the same way, if PDCP decompressor device needs to feed back the status of inner header compression, the format of control PDU is shown in FIG. 3. Set D/C field as 0 and the value in PDU type field as 010, process other fields according to the present procedure, and send this control PDU to PDCP decompressor device at opposite end.

When receiving this control PDU, PDCP compressor device analyzes it and read D/C field to know it is control PDU, and read PDU type field to know this control PDU carries the feedback information of inner header compression. Therefore, only sending Interspersed ROHC feedback packet carried in this control PDU to inner header compression processing module for corresponding processing is needed.

Embodiments II: Expand the information in PDU Type field (including cascading feedback type of inner and outer compression feedback)

The format of control PDU is still shown in FIG. 3. However, value selection rule of PDU type field is adjusted as shown in Table 4.

TABLE 4

Meaning of Field Information Value of PDU Type Field

| Bit | Description |
|---|---|
| 000 | PDCP status report |
| 001 | Interspersed ROHC feedback packet for outer header |
| 010 | Interspersed ROHC feedback packet for inner header |
| 011 | Interspersed ROHC feedback packet for outer header and inner header |
| 100-111 | reserved |

In this embodiment, when PDCP decompressor device needs to separately send outer or inner header compression feedback to PDCP compressor device, refer to Embodiment I for processing procedure. Therefore, it is not explained here again.

On the other hand, when PDCP decompressor device needs to feed back the status of outer and inner header compression at the same time, the format of control PDU is still shown in FIG. 3. Set D/C field as 0 and the value in PDU type field as 011, and place feedback packet of outer or inner header compression in Interspersed ROHC feedback packet field in FIG. 3 according to specified order (this order can be pre-stipulated or negotiated and keeps consistent in PDCP decompression and compressor device), and send this control PDU to PDCP decompressor device at opposite end.

When receiving this control PDU, PDCP compressor device analyzes it and read D/C to know it is control PDU, and read PDU type field to know this control PDU contains the feedback information of outer or inner header compression at the same time. Therefore, firstly send Interspersed ROHC feedback packet carried in this control PDU to compression module corresponding to compression feedback placed in the front according to specified order. For example, it is stipulated in the present standard that inner header compression feedback follows after the outer header compression. Therefore, Interspersed ROHC feedback packet shall be firstly sent to outer header compression processing module, then this module shall read feedback information (it cannot be wrongly read owing to size information in feedback packet) according to feedback format and send the remaining content of Interspersed ROHC feedback packet excluding outer header compression feedback information to inner header compression module for corresponding processing.

Embodiment III: Expand the format of control PDU and a Size field, indicate feedback type per PDU Type and allow feedback cascading for inner and outer header compression Format expansion of control PDU is shown in FIG. 7.

Herein, D/C field is consistent to that in the standard and value selection of PDU Type field is consistent to that in Table 4 of Embodiment II. Increase Size field, which is optional and appears only when cascading feedback of outer and inner header compression and is used to indicate the size of previous compression feedback with byte as unit.

In this embodiment, when PDCP decompressor device needs to separately send outer or inner header compression feedback to PDCP compressor device, PDU Type field is set according to Embodiment I without Size field. The processing procedure is the same as that of Embodiment I.

Figure 7:
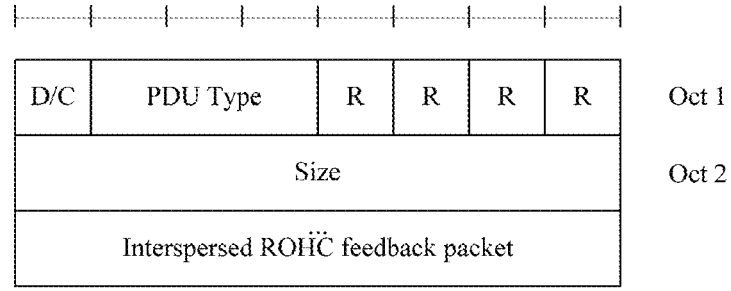
FIG. 7 is a diagram of a kind of control PDU in the embodiments of the present invention.

In particular, when PDCP decompressor device needs to feed back the status of outer and inner header compression at the same time, the format of control PDU is shown in FIG. 7. Set D/C field as 0, PDU type field as 011, and Size field as the size of a feedback packet in the front with byte as unit, and place feedback packet of outer and inner header compression in Interspersed ROHC feedback packet field in FIG. 7 according to specified order, and send this control PDU to PDCP compressor device at opposite end.

When receiving this control PDU, PDCP compressor device analyzes it and read D/C field to know it is control PDU, and read PDU type field to know it contains feedback information of outer and inner header compression, then read Size field to obtain the size of the first feedback packet. Therefore, it is necessary to send the data of byte of Size fields in the front in Interspersed ROHC feedback packet field carried in this control PDU to compression module corresponding to compression feedback in the front according to specified order for processing. For example, it is stipulated in the present standard that inner header compression feedback follows after the outer. Thus, such data shall be sent firstly to outer header compression processing module for corresponding processing and the remaining content in Interspersed ROHC feedback packet field excluding outer header compression feedback information shall be sent to inner header for corresponding processing.

Figure 8:
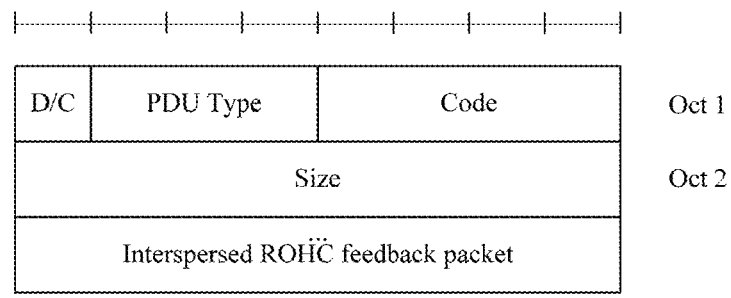
FIG. 8 is a diagram of a kind of control PDU in the embodiments of the present invention.

Embodiment IV: Expand the format of control PDU and multiple R fields as indication fields, indicate feedback type per PDU Type field and allow feedback cascading for outer and inner header compression Format expansion of control PDU is shown in FIG. 8.

Herein, D/C field is consistent to that in the standard and value selection of PDU Type field is consistent to that in Table 4 of Embodiment II. Furthermore, change 4 R fields as reserved field into Code field as expanded indication field. The Size field is optional. Meaning example of the two is as follows:

When the value of PDU Type field is 011 (namely compression feedback cascading of two headers) and that of Code field is 0000, Size field will appear to indicate the size of the first header compression feedback with byte as unit.

When the value of Code field is 0001-1111, Size field will not appear and Code field indicates the size of the first header compression feedback with byte as unit.

When the value of PDU Type field refers to other values rather than 011, the value of Code field is 0000 and Size field will not appear.

In this embodiment, when PDCP decompressor device needs to separately send outer or inner header compression feedback to PDCP compressor device, PDU Type field can be set according to Embodiment I, Code field is set as 0000 and Size field will not appear. The processing procedure is the same as that in Embodiment I.

When PDCP decompressor device needs to feed back the status of outer and inner header compression at the same time, the format of control PDU is shown in FIG. 8. Set D/C field as 0 and PDU type field as 011. If the size of feedback packet which shall be placed in the front according to specified order is equivalent to 15 bytes, Code field will indicate this size and Size field will not appear; if this size is greater than 15 bytes, Code value shall be 0000 and Size field will appear to indicate the size of a feedback packet in the front with byte as unit. Place feedback packet of outer and inner header compression in Interspersed ROHC feedback packet field in FIG. 8 according to specified order, and send this control PDU to compressor device at opposite end.

When receiving this control PDU, PDCP compressor device will analyze it and read D/C field to know it is control PDU, and read PDU type to know it contains feedback information of outer and inner header compression at the same time. If value of Code field refers to non-0000, then the value will be taken as the size of the first feedback packet; otherwise, read Size field to obtain the size of the first feedback packet. According to the size of the first feedback packet, send the data of corresponding number of bytes in the front in Interspersed ROHC feedback packet field carried in this packet to compression module corresponding to compression feedback in the front according to specified order for processing. For example, it is stipulated in the present standard that inner header compression feedback follows after the outer. Therefore, it is necessary to send the data of corresponding number of bytes in the front in Interspersed ROHC feedback packet field to outer header compression processing module, and the remaining content of Interspersed ROHC feedback packet field excluding outer header compression feedback information shall be sent to inner header compression module for corresponding processing.

It should be specifically pointed out that expansion embodiments of Code field mentioned above only occupy 4 R fields of all. It can occupy part of R fields in light of requirements, such as two or three. Specific occupation quantity of R fields will not affect protective scope of the present invention.

Embodiment V: Expand the information in R fields (excluding cascading feedback type)

Figure 9:
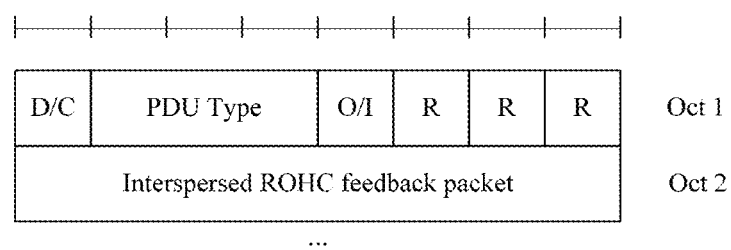
FIG. 9 is a diagram of a kind of control PDU in the embodiments of the present invention.

Format expansion embodiment of control PDU is shown in FIG. 9.

Herein, the value of D/C field and PDU Type field is the same as that stipulated in the present standard, namely in background introduction.

Change one of four R fields as reserved field to O/I field to indicate whether it is outer or inner header compression feedback. The value selection example is shown in Table 5:

TABLE 5

Meaning of Field Information Value of O/I Field

| Bit | Description |
| --- | --- |
| 0 | Outer header compression feedback |
| 1 | Inner header compression feedback |

When PDCP decompressor device needs to feedback the status of outer header compression, the format of control PDU is shown in FIG. 9. Set D/C field as 0, PDU type field as 001 and O/I field as 0, process other fields according to the present procedure and send this control PDU to compressor device at opposite end.

When receiving this control PDU, PDCP compressor device will analyze it and read D/C field to know it is control PDU, and read PDU type field to know it is feedback information of header compression, and read O/I field to know it is outer header compression feedback. Therefore, it is necessary to send Interspersed ROHC feedback packet carried in this packet to outer header compression processing module for corresponding processing.

Inner header compression feedback is implemented in the same way. Therefore it is not explained here again.

Embodiment VI: Expand the information in R field (including cascading feedback type of outer and inner header compression)

Figure 10:
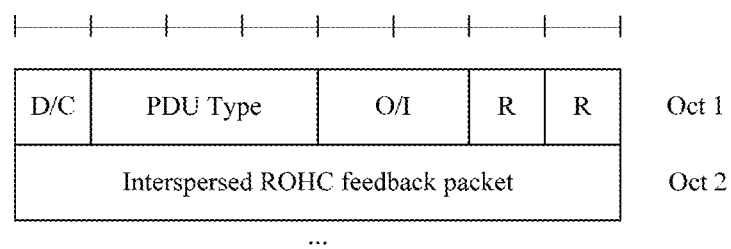
FIG. 10 is a diagram of a kind of control PDU in the embodiments of the present invention.

Format expansion example of control PDU is shown in FIG. 10.

Herein, the value of D/C field and PDU Type field is the same as that stipulated in present standard, namely in background introduction.

Change two of four R fields as reserved field to O/I field to indicate whether it is outer or inner header compression feedback or cascading of the two. It should be noted that cascading order shall be stipulated in advance and value selection example is shown in Table 6:

TABLE 6

Meaning of Field Information Value of O/I Field

| Bit | Description |
| --- | --- |
| 00 | Outer header compression feedback |
| 01 | Inner header compression feedback |
| 10 | Cascading of outer and inner header compression feedback. Cascading order shall be stipulated in the standard. |
| 11 | Reserved value |

In this embodiment, when PDCP decompressor device needs to separately send outer or inner header compression feedback to PDCP compressor device, O/I field is set accordingly. Refer to Embodiment V for processing procedure.

When PDCP decompressor device needs to feed back the status of outer and inner header compression at the same time, the format of control PDU is shown in FIG. 10. Set D/C field as 0 and PDU type field as 001, set the value of O/I as 10, place feedback packet of outer and inner header compression in Interspersed ROHC feedback packet field in FIG. 10 according to specified order and send this control PDU to compressor device at opposite end.

When receiving this control PDU, PDCP compressor device will analyze it and read D/C field to know it is control PDU, and read PDU type field to know it is compression feedback information and O/I field to know it is compression feedback information of two headers containing specified order. Therefore, it is necessary to send Interspersed ROHC feedback packet carried in this packet to compression module corresponding to compression feedback placed in the front according to specified order for processing. For example, it is stipulated in the present standard that inner header compression feedback follows after the outer. Therefore, Interspersed ROHC feedback packet shall be sent firstly to outer header compression processing module, then this module shall read feedback information (it cannot be wrongly read owing to size information in feedback packet) according to feedback format and send the remaining content of Interspersed ROHC feedback packet excluding outer header compression feedback information to inner header compression module for corresponding processing.

Embodiment VII: Expand the format of control PDU, allow cascading of outer and inner header compression feedback and expand Size field to indicate the size.

Format expansion example of control PDU is shown in FIG. 11.

Herein, the value of D/C field and PDU Type field is the same as that stipulated in the present standard, namely in background introduction.

Change two of four R fields as reserved field to O/I field to indicate whether it is outer or inner header compression feedback or cascading of the two. It should be noted that cascading order shall be stipulated in advance and value selection example is shown in Table 7:

TABLE 7

Meaning of Field Information Value of O/I Field

| Bit | Description |
| --- | --- |
| 00 | Outer header compression feedback |
| 01 | Inner header compression feedback |
| 10 | Cascading of outer and inner header compression feedback. Cascading order shall be stipulated in the standard. |
| 11 | Reserved value |

Increase Size field, which is optional and appears only during cascading of outer and inner header compression feedback and is used to indicate the size of previous compression feedback with byte as unit.

In this embodiment, when PDCP decompressor device needs to separately send outer or inner header compression feedback to PDCP decompressor device, O/I is set correspondingly according to the above description and Size field will not appear. Refer to Embodiment V for processing procedure.

When PDCP decompressor device needs to feed back the status of outer and inner header compression at the same time, the format of control PDU is still shown in FIG. 11. Set D/C field as 0, PDU type field as 001, O/I field as 10 and Size field as the size of a feedback packet in the front with byte as unit, place feedback packets of outer and inner header compression in Interspersed ROHC feedback packet field in FIG. 11 according to the specific order and send this control PDU to compressor device at opposite end.

When receiving this control PDU, PDCP compressor device will analyze it and read D/C field to know it is control PDU, and read PDU type field to know it is header compression feedback information, and O/I field to know it is feedback information of two headers, then read Size field to obtain the size of the first feedback packet. Therefore, it is necessary to send the data of byte of Size fields in the front in Interspersed ROHC feedback packet field carried in this packet to compression module corresponding to compression feedback in the front according to specified order for processing. For example, it is stipulated in the present standard that inner header compression feedback follows after the outer. Thus, such data shall be sent to outer header compression processing module for corresponding processing and the remaining content of Interspersed ROHC feedback packet field excluding outer header compression feedback information shall be sent to inner header compression processing module for corresponding processing.

Embodiment VIII: Expand the format of control PDU and multiple R fields as indication fields, allow cascading between outer and inner header compression feedback and indicating the size.

Format expansion embodiment of control PDU is shown in FIG. 12.

Herein, the value of D/C field and PDU Type field is the same as that stipulated in the present standard, namely in background introduction.

Change two of four R fields as reserved field to O/I field to indicate whether it is outer or inner header compression feedback or cascading of the two. It should be noted that cascading order shall be stipulated in advance and value selection example is shown in Table 8:

TABLE 8

Meaning of Field Information Value of O/I Field

| Bit | Description |
| --- | --- |
| 00 | Outer header compression feedback |
| 01 | Inner header compression feedback |
| 10 | Cascading of outer and inner header compression feedback. Cascading order shall be stipulated in the standard. |
| 11 | Reserved value |

Change 2 of 4 R fields as reserved field into Code field as expanded indication field. The Size field is optional. Meaning example of the two is as follows:

When the value of O/I field is 10 (namely compression feedback cascading of two headers) and that of Code field is 00, Size field will appear to indicate the size of the first header compression feedback with byte as unit;

When the value of Code field is 01-11, Size field will not appear and Code field indicates the size of the first header compression feedback with byte as unit.

When the value of O/I field refers to other values rather than 10, the value of Code field shall be 00 and Size field will not appear.

In this embodiment, when PDCP decompressor device needs to separately send outer or inner header compression feedback to PDCP compressor device, O/I field is set according to the above description, Code field shall be set as 00 and Size field will not appear. The processing procedure is the same as that in Embodiment V.

When PDCP decompressor device needs to feed back the status of outer and inner header compression at the same time, the format of control PDU is still shown in FIG. 12. Set D/C field as 0, PDU type field as 001 and O/I field as 10. The size of feedback packet which shall be placed in the front is less than or equivalent to 3 bytes, Code field will indicate this size and Size field will not appear; if this size is greater than 3 bytes, Code value is 00 and Size field will appear to indicate the size of a feedback packet in the front with byte as unit. Place feedback packet of outer and inner header compression in Interspersed ROHC feedback packet field in FIG. 12 according to specified order and send this control PDU to compressor device at opposite end.

When receiving this control PDU, PDCP compressor device will analyze it to read D/C field to know it is control PDU, read PDU type field to know it is header compression feedback information, and read O/I field to know it is feedback information of outer and inner header compression. If value of Code field refers to non-00, the value will be taken as the size of the first feedback packet; otherwise, continue to read Size field to obtain this size. According to this size, send the data of corresponding number of bytes in the front in Interspersed ROHC feedback packet field carried in this packet to compression module corresponding to compression feedback in the front according to specified order for processing. For example, it is stipulated in the present standard that inner header compression feedback follows after the outer. Therefore, it is necessary to send the data of corresponding number of bytes in the front in Interspersed ROHC feedback packet field to outer header compression processing module, and the remaining content of Interspersed ROHC feedback packet field excluding outer header compression feedback information shall be sent to inner header compression module for corresponding processing.

Based on the same inventive concept, the embodiments of the present invention also provide a kind of PDCP compression and decompressor device. The principle for solving problems with these devices is similar to a feedback method for header compression feedback information. Therefore, the implementation of these devices can refer to that of the method. Repeated parts are not described here again.

Structure diagram of PDCP compressor device is shown in FIG. 13, including:

Determination module 131, which is used to determine source type of header compression feedback information according to received control PDU sent by PDCP decompressor device.

In specific application scene, PDCP compressor device determines source type of header compression feedback information according to control PDU, specifically including:

PDCP compressor device determines source type of header compression feedback information according to the information in PDU Type field of control PDU; or, PDCP compressor device determines source type of header compression feedback information according to the information in type indication field comprised of one or more reserved fields in control PDU;

Herein, resource types of information in PDU Type field of control PDU or in type indication field comprised of one or more reserved fields in control PDU and of indicated header compression feedback information includes:

Separate feedback type of outer and inner header compression; or,

Separate feedback type of outer header compression, separate feedback type of inner header compression, and cascading feedback type of outer and inner header compression according to preset feedback order.

Processing module 132, which is used to correspondingly process header compression feedback information carried in control PDU according to source type of such information determined by determination module 131.

Furthermore, this PDCP compressor device also includes:

Setting module 133, which is used to set processing strategies for outer and inner header compression as well as feedback order;

Processing module 132, which is specifically used to:

When determination module 131 determines that source type refers to separate feedback type of outer header compression or separate feedback type of inner header compression according to control PDU, processing module 132 processes such information carried in control PDU according to corresponding processing strategies for outer or inner header compression set by setting module 133;

When determination module 131 determines that source type of header compression feedback information refers to cascading feedback type of outer and inner header compression according to feedback order set by setting module 133 according to control PDU, processing module 132 processes such information carried in control PDU according to feedback order set by setting module 133, or process it with processing strategies for outer and inner header compression set by setting module 133 after it is differentiated according to source type.

Herein, when it's determined that source type of header compression feedback information refers to cascading feedback type of outer and inner header compression according to feedback order set by setting module 133 according to control PDU, processing module 132 is specifically used to:

When control PDU excludes size information of header compression feedback information, processing module 132 will perform direct outer or inner header compression processing for such information carried in control PDU according to the feedback order set by setting module, and perform header compression processing for such remaining information after processing;

When control PDU includes size information of header compression feedback information, processing module 132 acquires such size information and divides header compression feedback information in control PDU into two parts according to such size information, and processes the two parts of such information with corresponding processing strategies according to preset feedback order.

Herein, size information of header compression feedback information carried in control PDU specifically refers to indication field comprised of size information field and/or one or more reserved fields included in control PDU;

Processing module 132 acquires size information of header compression feedback information, including:

When control PDU includes size information field rather than indication field, processing module 132 directly acquires size information of header compression feedback information in size information field;

When control PDU includes indication field, processing module 132 identifies the content of indication field. If this content refers to size information of header compression feedback information, control PDU excludes size information field and processing module 132 directly acquires size information of header compression feedback information in size information field. If this content refers to indication information of size information field in control PDU, processing module 132 inquires corresponding size information field in control PDU to acquire size information of header compression feedback information in size information field.

Structure diagram of PDCP decompressor device is shown in FIG. 14, including:

Generation module 141, which is used to generate control PDU carrying header compression feedback information according to source type of such information and is specifically used to:

Generation module 141, which is used to generate control PDU carrying header compression feedback information with source type of such information identified by the information in PDU Type field of control PDU; or, Generation module 141, which is used to generate control PDU carrying header compression feedback information with source type of such information identified by the information in type indication field comprised of one or more reserved fields in control PDU;

Herein, source type of header compression feedback information refers to separate feedback type of outer or inner header compression, or cascading feedback type of outer and inner header compression according to preset feedback order.

Sending module 142, which is used to send control PDU generated by said generation module 141 to PDCP decompressor device to enable it to correspondingly process header compression feedback information carried in said control PDU.

Herein, when source type of said header compression feedback information specifically refers to cascading feedback type of outer and inner header compression according to preset feedback order, said control PDU also includes:

Size information field of size information containing header compression feedback information; or, Indication field of size information containing header compression feedback information; or, Indication field of indication information containing size information field in control PDU, and size information field of size information containing header compression feedback information.

Through description of the above embodiments, technical personnel of the field can clearly understand that the present invention is realized depending on hardware or software and necessary general hardware platform. Based on this understanding, the technical solution of the present invention can be reflected by means of software product. This software product is stored in a nonvolatile storage medium (such as CD-ROM, USB flash disk, mobile hard disk, etc.) including several instructions to enable a computer unit (such as personal computer, service port, or network equipment, etc.) to implement the methods described in all implementation scenes of the present invention.

Technical personnel of the field can understand that the drawings only refer to the diagram of a preferred implementation scene, and the module or procedure attached is not necessary for the implementation of the embodiments of the present invention.

Technical personnel of the field can understand that the module of the unit of an implementation scene can be distributed in such scene according to implementation scene description, or located in one or more units of another implementation scene through corresponding changes. Modules of the implementation scene mentioned above can be merged into one module, or further divided into multiple sub-modules.

The number of the aforementioned implementation scenes of the present invention is only used for description rather than for representing advantages or disadvantages.

Only several specific implementation scenes of the present invention are released above. However, the present invention is not only comprised of those. Any change that technical personnel of the field can predict shall be protected by the present invention.

What is claimed is:

1. A method for feeding back header compression feedback information, comprising:

after receiving control Packet Data Unit sent by Packet Data Convergence Protocol decompressor device, Packet Data Convergence Protocol compressor device determines source type of the header compression feedback information according to said control Packet Data Unit;

said Packet Data Convergence Protocol compressor device processes header compression feedback information carried in said control Packet Data Unit according to the determined source type of the header compression feedback information;

wherein when determining that the source type of the header compression feedback information is cascading feedback type of outer and inner header compression with the preset feedback order according to said control Packet Data Unit, said Packet Data Convergence Protocol compressor device processes header compression feedback information carried in said control Packet Data Unit according to the determined source type of the header compression feedback information, including:

said Packet Data Convergence Protocol compressor device processes the header compression feedback information carried in said control Packet Data Unit according to the preset feedback order or processes the header compression feedback information according to the respective processing strategy for the outer header compression or the respective strategy for the inner header compression after the header compression feedback information is differentiated according to the source type, including:

when said control Packet Data Unit does not include size information of the header compression feedback information, said Packet Data Convergence Protocol compressor device directly performs outer header compression processing or inner header compression processing for the header compression information carried in said control Packet Data Unit, and after processing, performs header compression processing for remaining header compression feedback information according to said preset feedback order;

when said control Packet Data Unit includes the size information of the header compression feedback information, said Packet Data Convergence Protocol compressor device acquires the size information of said header compression feedback information, divides the header compression feedback information carried in said control Packet Data Unit into two parts according to said size information, and processes each of the two parts of the header compression information based on respective processing strategy according to said preset feedback order.

2. The method as claimed in claim 1, wherein when the source type of the header compression feedback information is the separate feedback type of outer header compression or the separate feedback type of inner header compression, said Packet Data Convergence Protocol compressor device processes header compression feedback information carried in said control Packet Data Unit according to the determined source type of the header compression feedback information, including:

when determining that the source type of the header compression feedback information is the separate feedback type of the outer header compression according to said control Packet Data Unit, said Packet Data Convergence Protocol compressor device it processes the header compression feedback information carried in said control Packet Data Unit according to respective processing strategy for the outer header compression;

when determining that the source type of the header compression feedback information is the separate feedback type of the inner header compression according to said control Packet Data Unit, said Packet Data Convergence Protocol compressor device processes the header compression feedback information carried in said control Packet Data Unit according to respective processing strategy for the inner header compression.

3. The method as claimed in claim 1, wherein said control Packet Data Unit includes the size information of the header compression feedback information, which is indication field comprised of size information field and/or one or more reserved fields included in the control Packet Data Unit, wherein:

said Packet Data Convergence Protocol compressor device the size information of said header compression feedback information, including:

when said control Packet Data Unit includes the size information field and does not include the indication field, said Packet Data Convergence Protocol compressor device directly acquires the size information of said header compression feedback information in said size information field;

when said control Packet Data Unit includes the indication field, said Packet Data Convergence Protocol compressor device identifies the content in said indication field; and wherein if the content is the size information of the header compression feedback information, said control Packet Data Unit does not include the size information field, and said Packet Data Convergence Protocol compressor device directly acquires the size information of the header compression feedback information in said indication field; and wherein if the content is the indication information of the size information field in said control Packet Data Unit, said Packet Data Convergence Protocol compressor device inquires corresponding size information field in said control Packet Data Unit to obtain the size information of the header compression feedback information in said size information field.

4. The method as claimed in claim 1, wherein said Packet Data Convergence Protocol compressor device determines the source type of the header compression feedback information according to said control Packet Data Unit, including:

said Packet Data Convergence Protocol compressor device determines the source type of the header compression feedback information according to the information in Packet Data Unit Type field in said control Packet Data Unit; or said Packet Data Convergence Protocol compressor device determines the source type of the header compression feedback information according to the information of type indication field comprised of one or more reserved fields in said control Packet Data Unit.

5. The method as claimed in claim 4, wherein, source types of header compression feedback information indicated by the information in Packet Data Unit Type field in said control Packet Data Unit or the information in type indication field comprised of one or more reserved fields in said control Packet Data Unit includes:

separate feedback type of outer header compression and separate feedback type of inner header compression; or separate feedback type of outer header compression, separate feedback type of inner header compression, and cascading feedback type of outer and inner header compression with preset feedback order.

6. A Packet Data Convergence Protocol compressor device, comprising:

a processor; and a non-volatile storage medium, configured to be connected to the processor via a bus interface, and store programs and data to be used by the processor, wherein upon the processor executes the programs and data stored in the non-volatile storage medium, the following modules are implemented:

a determination module, configured to determine the source type of the header compression feedback information according to received control Packet Data Unit sent by the Packet Data Convergence Protocol decompressor device;

a processing module, configured to process header compression feedback information carried in said control Packet Data Unit according to source type of the header compression feedback information determined by said determination module; and a setting module, configured to set processing strategy for outer header compression, processing strategy for inner header compression, and said feedback order, wherein when said determination module determines that the source type of the header compression feedback information is the cascading feedback type of the outer and inner header compression with feedback order set by said setting module according to said control Packet Data Unit, said processing module processes the header compression feedback information carried in said control Packet Data Unit according to feedback order set by said setting module, or processes the header compression feedback information carried in said control Packet Data Unit according to the respective processing strategy for the outer header compression or the respective strategy for the inner header compression set by said setting module after the header compression feedback information is differentiated according to the source type, including:

when said control Packet Data Unit does not include size information of the header compression feedback information, said processing module directly performs outer header compression processing or inner header compression processing for the header compression information carried in said control Packet Data Unit according to the feedback order set by said setting module and after processing, performs header compression processing for remaining header compression feedback information;

when said control Packet Data Unit includes the size information of the header compression feedback information, said processing module acquires the size information of the header compression feedback information, divides the header compression feedback information carried in said control Packet Data Unit into two parts according to said size information, and processes each of the two parts of the header compression information based on respective processing strategy according to said preset feedback order.

7. The Packet Data Convergence Protocol compressor device as claimed in claim 6, wherein:

when said determination module determines that the source type of the header compression feedback information is the separate feedback type of the outer header compression or the separate feedback type of the inner header compression according to said control Packet Data Unit, said processing module processes the header compression feedback information carried in said control Packet Data Unit according to respective processing strategy for the outer header compression or respective processing strategy for the inner header compression set by said setting module.

8. The Packet Data Convergence Protocol compressor device as claimed in claim 6, wherein said control Packet Data Unit includes the size information of the header compression feedback information, which is indication field comprised of size information field and/or one or more reserved fields included in the control Packet Data Unit; wherein:

said processing module acquires the size information of said header compression feedback information, including:

when said control Packet Data Unit includes the size information field and does not include the indication field, said processing module directly acquires the size information of said header compression feedback information in said size information field;

when said control Packet Data Unit includes the indication field, said processing module identifies the content in said indication field; and wherein if the content is the size information of the header compression feedback information, said control Packet Data Unit does not include the size information field, and said processing module directly acquires the size information of the header compression feedback information in said indication field; and wherein if the content is the indication information of the size information field in said control Packet Data Unit, said processing module inquires corresponding size information field in said control Packet Data Unit to obtain the size information of the header compression feedback information in said size information field.

9. The Packet Data Convergence Protocol compressor device as claimed in claim 6, wherein, said Packet Data Convergence Protocol compressor device determines the source type of the header compression feedback information according to said control Packet Data Unit, including:

said Packet Data Convergence Protocol compressor device determines the source type of the header compression feedback information according to the information in Packet Data Unit Type field in said control Packet Data Unit; or, said Packet Data Convergence Protocol compressor device determines the source type of the header compression feedback information according to the information in type indication field comprised of one or more reserved fields in said control Packet Data Unit;

wherein, source types of header compression feedback information indicated by the information in Packet Data Unit Type field in said control Packet Data Unit or the information in type indication field comprised of one or more reserved fields in said control Packet Data Unit includes:

separate feedback type of outer header compression and separate feedback type of inner header compression; or separate feedback type of outer header compression, separate feedback type of inner header compression, and cascading feedback type of outer and inner header compression with preset feedback order.

10. A method for feeding back header compression feedback information, comprising:

Packet Data Convergence Protocol decompressor device generating control Packet Data Unit carrying header compression feedback information according to source type of the header compression feedback information;

said Packet Data Convergence Protocol decompressor device sending said control Packet Data Unit to the Packet Data Convergence Protocol compressor device, so that the Packet Data Convergence Protocol compressor device determines source type of the header compression feedback information according to said control Packet Data Unit, and processes the header compression feedback information carried in said control Packet Data Unit according to the determined source type of the header compression feedback information, wherein when determining that the source type of the header compression feedback information is cascading feedback type of outer and inner header compression with the preset feedback order according to said control Packet Data Unit, said Packet Data Convergence Protocol compressor device processes header compression feedback information carried in said control Packet Data Unit according to the determined source type of the header compression feedback information, including:

said Packet Data Convergence Protocol compressor device processes the header compression feedback information carried in said control Packet Data Unit according to the preset feedback order or processes the header compression feedback information according to the respective processing strategy for the outer header compression or the respective strategy for the inner header compression after the header compression feedback information is differentiated according to the source type, including:

when said control Packet Data Unit does not include size information of the header compression feedback information, said Packet Data Convergence Protocol compressor device directly performs outer header compression processing or inner header compression processing for the header compression information carried in said control Packet Data Unit, and after processing, performs header compression processing for remaining header compression feedback information according to said preset feedback order;

when said control Packet Data Unit includes the size information of the header compression feedback information, said Packet Data Convergence Protocol compressor device acquires the size information of said header compression feedback information, divides the header compression feedback information carried in said control Packet Data Unit into two parts according to said size information, and processes each of the two parts of the header compression information based on respective processing strategy according to said preset feedback order.

11. The method as claimed in claim 10, wherein when the source type of said header compression feedback information specifically is the cascading feedback type of the outer and inner header compression with preset feedback order, said control Packet Data Unit also includes:

the size information field of the size information containing header compression feedback information; or, the indication field of the size information containing header compression feedback information; or, the indication field of the indication information containing size information field in the control Packet Data Unit and the size information field of the size information containing the header compression feedback information.

12. The method as claimed in claim 10, wherein said Packet Data Convergence Protocol decompressor device generates control Packet Data Unit carrying the header compression feedback information according to the source type of the header compression feedback information, including:

said Packet Data Convergence Protocol decompressor device identifies the source type of the header compression feedback information according to the information in Packet Data Unit Type field in said control Packet Data Unit; or, said Packet Data Convergence Protocol decompressor device identifies the source type of the header compression feedback information according to the information in type indication field comprised of one or more reserved fields in said control Packet Data Unit;

wherein the source type of said header compression feedback information specifically is separate feedback type of outer header compression, separate feedback type of inner header compression, or cascading feedback type of outer and inner header compression with preset feedback order.

* * * * *